(12) United States Patent
Spiegel et al.

(10) Patent No.: US 8,428,453 B1
(45) Date of Patent: Apr. 23, 2013

(54) SINGLE MODE VISUAL MEDIA CAPTURE

(75) Inventors: Evan Thomas Spiegel, Pacific Palisades, CA (US); Robert Cornelius Murphy, El Cerrito, CA (US)

(73) Assignee: Snapchat, Inc., Pacific Palisades, CA (US)

( * ) Notice: Subject to any disclaimer, the term of this patent is extended or adjusted under 35 U.S.C. 154(b) by 0 days.

(21) Appl. No.: 13/570,188

(22) Filed: Aug. 8, 2012

(51) Int. Cl.
*G03B 17/00* (2006.01)
(52) U.S. Cl.
USPC .................................................. 396/299
(58) Field of Classification Search .......... 396/297, 396/299
See application file for complete search history.

(56) References Cited

U.S. PATENT DOCUMENTS

| | | | |
|---|---|---|---|
| 2007/0040931 A1* | 2/2007 | Nishizawa | 348/373 |
| 2008/0025701 A1* | 1/2008 | Ikeda | 386/120 |
| 2009/0015703 A1* | 1/2009 | Kim et al. | 348/333.12 |

* cited by examiner

*Primary Examiner* — W. B. Perkey
(74) *Attorney, Agent, or Firm* — Cooley LLP

(57) ABSTRACT

An electronic device includes digital image sensors to capture visual media, a display to present the visual media from the digital image sensors and a touch controller to identify haptic contact engagement, haptic contact persistence and haptic contact release on the display. A visual media capture controller alternately records the visual media as a photograph or a video based upon an evaluation of the time period between the haptic contact engagement and the haptic contact release.

19 Claims, 3 Drawing Sheets

SINGLE MODE VISUAL MEDIA CAPTURE

FIELD OF THE INVENTION

This invention relates generally to capturing visual media, such as photographs and videos. More particularly, this invention relates to single mode visual media capture that alternately produces photographs and videos.

BACKGROUND OF THE INVENTION

Current methods of visual media recording require that a user specify the format of the visual media—either a photograph or a video—prior to capture. Problematically, a user must determine the optimal mode for recording a given moment before the moment has occurred. Moreover, the time required to toggle between different media settings often results in a user failing to capture an experience.

SUMMARY OF THE INVENTION

An electronic device includes digital image sensors to capture visual media, a display to present the visual media from the digital image sensors and a touch controller to identify haptic contact engagement, haptic contact persistence and haptic contact release on the display. A visual media capture controller alternately records the visual media as a photograph or a video based upon an evaluation of the time period between the haptic contact engagement and the haptic contact release.

A non-transient computer readable storage medium includes executable instructions to process haptic contact signals from a display, record a photograph based upon a first haptic contact signal and record a video based upon a second haptic contact signal.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
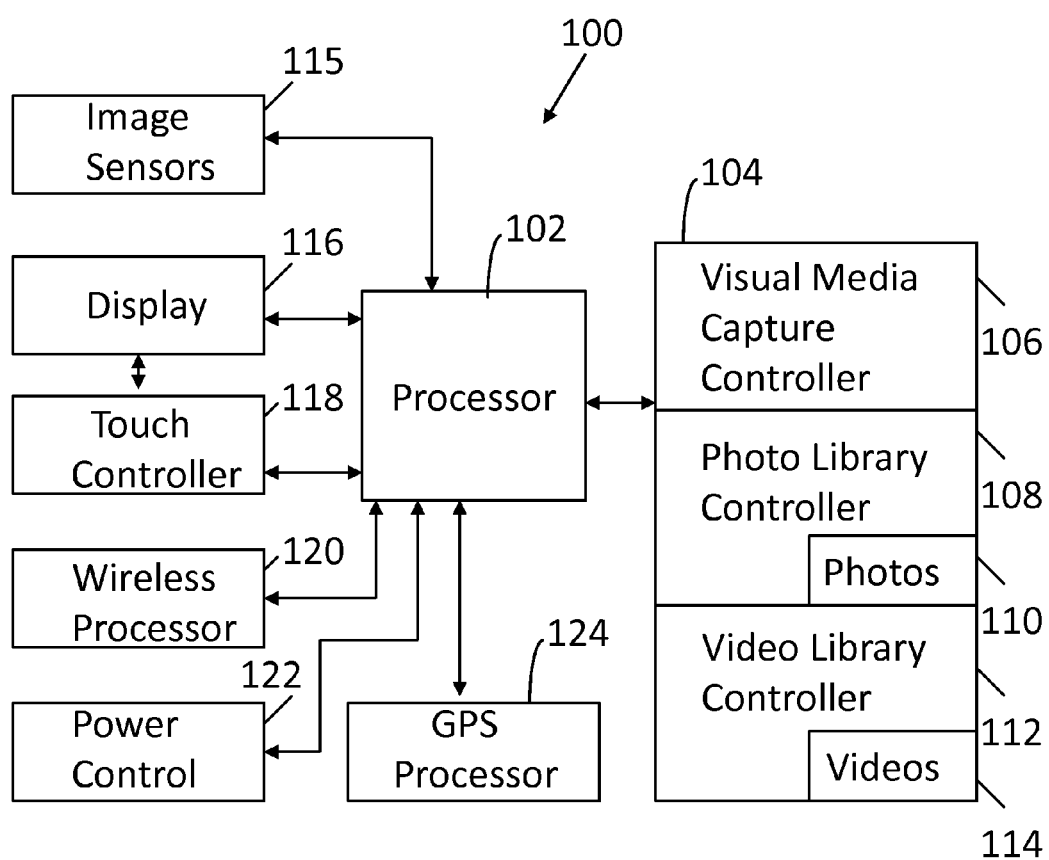
FIG. 1 illustrates components of an electronic device implementing single mode visual media capture in accordance with the invention.

FIG. 1 illustrates an electronic device 100 implementing operations of the invention. In one embodiment, the electronic device 100 is a smartphone with a processor 102 in communication with a memory 104. The processor 102 may be a central processing unit and/or a graphics processing unit. The memory 104 is a combination of flash memory and random access memory. The memory 104 stores a visual media capture controller 106 to implement operations of the invention. The visual media capture controller 106 includes executable instructions to alternately record a photograph or a video based upon the processing of haptic signals, as discussed below.

The visual media controller 106 interacts with a photograph library controller 108, which includes executable instructions to store, organize and present photos 110. The photograph library controller may be a standard photograph library controller known in the art. The visual media controller 106 also interacts with a video library controller 112, which includes executable instructions to store, organize and present videos 114. The video library controller may also be a standard video library controller known in the art.

The processor 102 is also coupled to image sensors 115. The image sensors 115 may be known digital image sensors, such as charge coupled devices. The image sensors capture visual media, which is presented on display 116. That is, in a visual media mode controlled by the visual media capture controller 106, the image sensors 115 capture visual media and present the visual media on the display 116 so that a user can observe the captured visual media.

A touch controller 118 is connected to the display 116 and the processor 102. The touch controller 118 is responsive to haptic signals applied to the display 116. In one embodiment, the visual media capture controller 106 presents a single mode input icon on the display 116. That is, the visual media capture controller 106 includes executable instructions executed by the processor to present a single mode input icon on the display 116.

The visual media capture controller 106 communicates with the processor 102 regarding haptic signals applied to the display 116, which are recorded by the touch controller 118. In one configuration, the visual media capture controller 106 processes haptic signals applied to the single mode input icon, as detailed in connection with the discussion of FIG. 2, and determines whether to record a photograph or a video, as discussed below.

The electronic device 100 may also include other components commonly associated with a smartphone, such as a wireless signal processor 120, a power control circuit 122 and a global positioning system processor 124. While many of components of FIG. 1 are known in the art, new functionality is achieved through the visual media capture controller 106.

Figure 2:
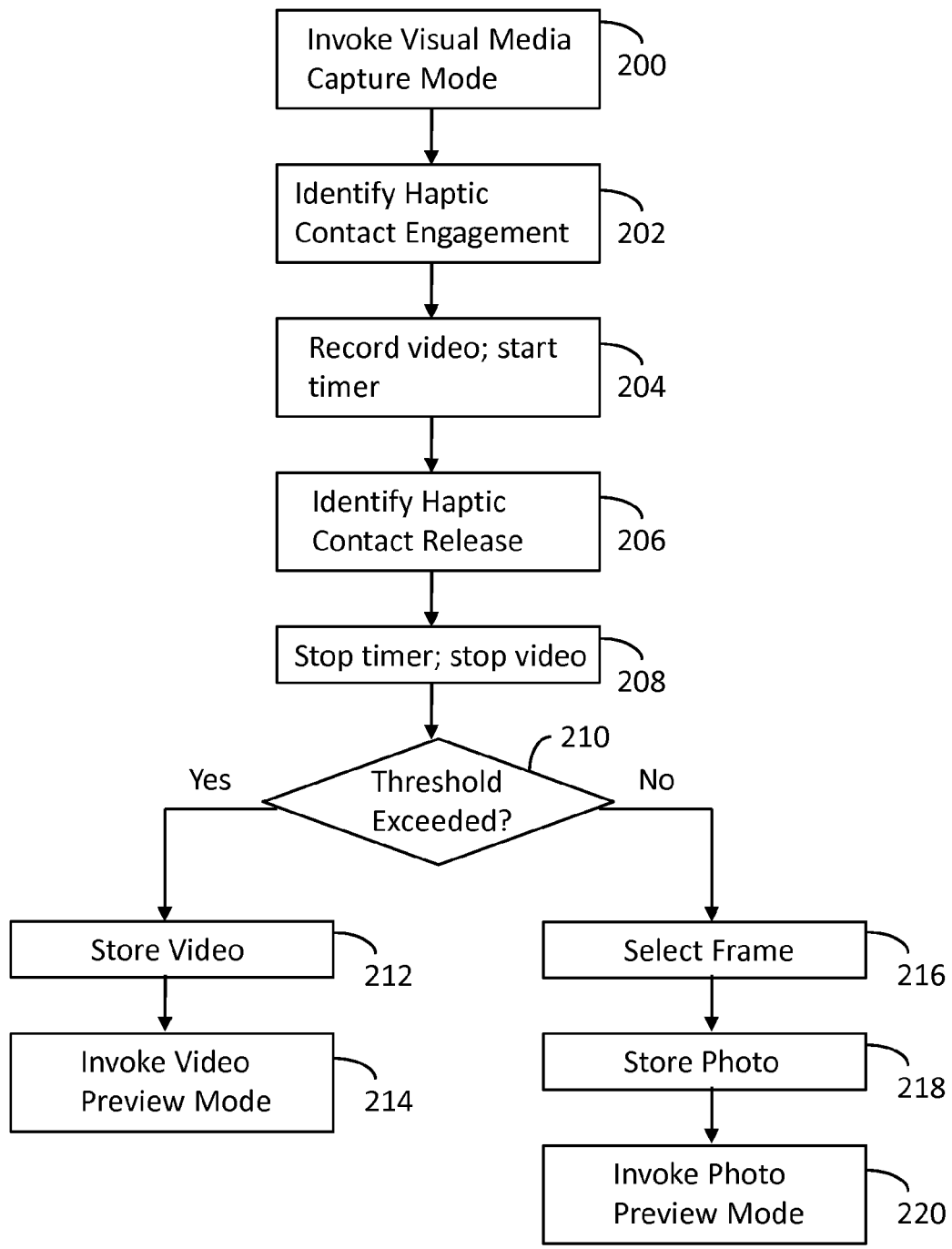
FIG. 2 illustrates processing operations associated with an embodiment of the invention.
Figure 3:
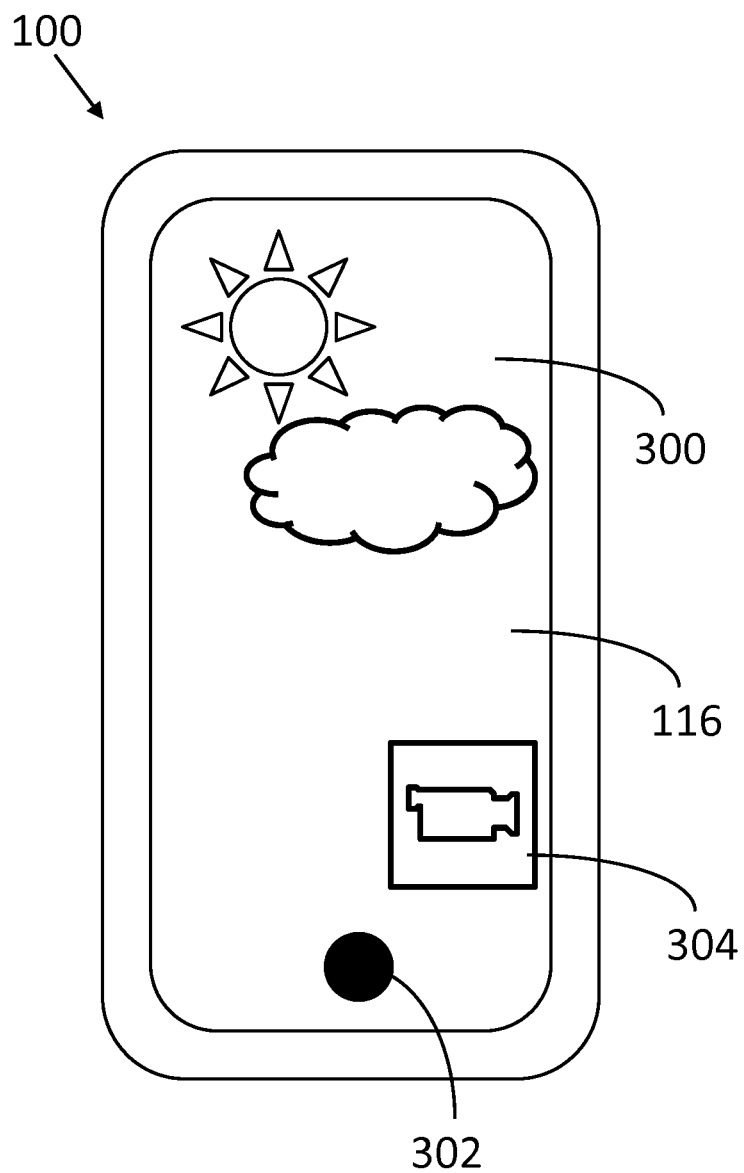
FIG. 3 illustrates the exterior of an electronic device implementing single mode visual media capture.

FIG. 2 illustrates processing operations associated with the visual media capture controller 106. Initially, a visual media capture mode is invoked 200. For example, a user may access an application presented on display 116 to invoke a visual media capture mode. FIG. 3 illustrates the exterior of electronic device 100. The figure also illustrates the display 116. The electronic device 100 is in a visual media capture mode and presents visual media 300. The display 116 also includes a single mode input icon 302. In one embodiment, the amount of time that a user presses the single mode input icon 302 determines whether a photograph will be recorded or a video. For example, if a user initially intends to take a photograph, then the icon 302 is engaged with a haptic signal. If the user decides that the visual media should instead be a video, the user continues to engage the icon 302. If the engagement persists for a specified period of time (e.g., 3 seconds), then the output of the visual media capture is determined to be video. The video mode may be indicated on the display 116 with an icon 304. Thus, a single gesture allows the user to seamlessly transition from a photograph mode to a video mode and therefore control the media output during the recording process. This is accomplished without entering one mode or another prior to the capture sequence.

Returning to FIG. 2, haptic contact engagement is identified 202. For example, the haptic contact engagement may be at icon 302 on display 116. The touch controller 118 generates haptic contact engagement signals for processing by the visual media capture controller 106 in conjunction with the processor 102. Alternately, the haptic contact may be at any location on the display 116.

Video is recorded and a timer is started in response to haptic contact engagement 204. The video is recorded by the processor 102 operating in conjunction with the memory 104. Alternately, a still frame is taken from the video feed and is stored as a photograph in response to haptic contact engagement and then video is recorded. The timer is executed by the processor 102 under the control of the visual media capture controller 106.

Video continues to record and the timer continues to run in response to persistent haptic contact on the display. Haptic contact release is subsequently identified 206. The timer is then stopped, as is the recording of video 208. The elapsed time recorded by the timer is then evaluated by the visual media capture controller 106 against a specified threshold (e.g., 3 seconds). If the threshold is exceeded (210—Yes), then video is stored 212. In particular, a video is sent to the video library controller 112 for handling. In one embodiment, the visual media capture controller 106 includes executable instructions to prompt the video library controller to enter a video preview mode 212. Consequently, a user can conveniently review a recently recorded video.

If the threshold is not exceeded (210—No), a frame of video is selected 216 and is stored as a photograph 218. As indicated above, an alternate approach is to capture a still frame from the camera video feed as a photograph upon haptic engagement. Such a photograph is then passed to the photographic library controller 108 for storage. The visual media capture controller 106 may then invoke a photo preview mode 220 to allow a user to easily view the new photograph.

The foregoing embodiment relies upon evaluating haptic contact engagement, haptic contact persistence and haptic contact release. Based upon the expired time, either a photograph or a video is preserved. Thus, a single recording mode allows one to seamlessly transition between photograph and video recording.

In an alternate embodiment, the visual media capture mode is responsive to a first haptic contact signal (e.g., one tap) to record a photograph and a second haptic contact signal (e.g., two taps) to record a video. In this case, there is not persistent haptic contact, but different visual media modes are easily entered. Indeed, the visual media capture controller 106 may be configured to interpret two taps within a specified period as an invocation of the video mode. This allows a user to smoothly transition from intent to take a picture to a desire to record video.

In another embodiment, a photograph is taken upon haptic contact engagement and a timer is started (but video is not recorded). If persistent haptic contact exists, as measured by the timer, for a specified period of time, then video is recorded. In this case, the user may then access both the photograph and the video. Indeed, an option to choose both a photograph and video may be supplied in accordance with different embodiments of the invention.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An electronic device, comprising:
    digital image sensors to capture visual media;
    a display to present the visual media from the digital image sensors;
    a touch controller to identify haptic contact engagement, haptic contact persistence and haptic contact release on the display; and
    a visual media capture controller to alternately record the visual media as a photograph or a video based upon an evaluation of the time period between the haptic contact engagement and the haptic contact release.

2. The electronic device of claim 1 wherein the visual media capture controller presents a single mode input icon on the display to receive the haptic contact engagement, haptic contact persistence and haptic content release.

3. The electronic device of claim 1 wherein the visual media capture controller selectively stores the photograph in a photograph library.

4. The electronic device of claim 3 wherein the visual media capture controller invokes a photograph preview mode.

5. The electronic device of claim 1 wherein the visual media capture controller selectively stores the video in a video library.

6. The electronic device of claim 5 wherein the visual media capture controller invokes a video preview mode.

7. The electronic device of claim 1 wherein the visual media capture controller selects a frame of the video to form the photograph.

8. The electronic device of claim 1 wherein the visual media capture controller stores the photograph upon haptic contact engagement.

9. The electronic device of claim 1 wherein the visual media capture controller includes instructions executed by a processor.

10. The electronic device of claim 9 further comprising a wireless signal processor, a power control circuit and a global positioning processor connected to the processor.

11. A non-transient computer readable storage medium, comprising executable instructions to:
  process haptic contact signals from a display;
  record a photograph based upon a first haptic contact signal; and
  record a video based upon a second haptic contact signal, wherein the second haptic contact signal is a haptic contact release signal that occurs after a specified period of time after the first haptic contact signal.

12. The non-transient computer readable storage medium of claim 11 wherein the first haptic contact signal is a haptic contact engagement signal.

13. The non-transient computer readable storage medium of claim 11 wherein the first haptic contact signal and the second haptic contact signal occur at single mode input icon.

14. The non-transient computer readable storage medium of claim 11 wherein the first haptic contact signal is a first specified gesture performed on the display.

15. The non-transient computer readable storage medium of claim 11 wherein the second haptic contact signal is a second specified gesture performed on the display.

16. The non-transient computer readable storage medium of claim 11 further comprising executable instructions to store the photograph in a photograph library.

17. The non-transient computer readable storage medium of claim 16 further comprising executable instructions to invoke a photograph preview mode.

18. The non-transient computer readable storage medium of claim 11 further comprising executable instructions to store the video in a video library.

19. The non-transient computer readable storage medium of claim 18 further comprising executable instructions to invoke a video preview mode.

* * * * *